(12) United States Patent
Tujague

(10) Patent No.: US 8,978,948 B2
(45) Date of Patent: Mar. 17, 2015

(54) GLOBAL POSITIONING SYSTEM (GPS) MOUNT

(71) Applicant: Duane Tujague, Opelousas, LA (US)

(72) Inventor: Duane Tujague, Opelousas, LA (US)

( * ) Notice: Subject to any disclaimer, the term of this patent is extended or adjusted under 35 U.S.C. 154(b) by 27 days.

(21) Appl. No.: 13/973,147

(22) Filed: Aug. 22, 2013

(65) Prior Publication Data

US 2014/0054918 A1    Feb. 27, 2014

Related U.S. Application Data

(60) Provisional application No. 61/692,506, filed on Aug. 23, 2012.

(51) Int. Cl.
*B60R 11/02* (2006.01)
*B60R 11/00* (2006.01)

(52) U.S. Cl.
CPC ..... *B60R 11/0258* (2013.01); *B60R 2011/0005* (2013.01); *B60R 2011/0052* (2013.01); *B60R 2011/0068* (2013.01); *Y10S 224/929* (2013.01)
USPC ............ 224/483; 224/557; 224/564; 224/929

(58) Field of Classification Search
CPC .............................................. B60R 2011/0258
USPC ......... 224/483, 557, 564, 929, 402, 452, 545, 224/555, 556, 565, 559; 296/37.12; D12/415
See application file for complete search history.

(56) References Cited

U.S. PATENT DOCUMENTS

| | | | |
|---|---|---|---|
| 4,097,012 A * | 6/1978 | McIntyre | 248/674 |
| 5,823,495 A * | 10/1998 | Joss et al. | 248/309.1 |
| 6,439,530 B1 * | 8/2002 | Schoenfish et al. | 248/346.06 |
| 7,062,300 B1 | 6/2006 | Kim | |
| 7,142,980 B1 | 11/2006 | Laverick et al. | |
| 7,313,477 B1 * | 12/2007 | Laverick et al. | 701/472 |
| 7,506,843 B2 * | 3/2009 | McKelvey | 248/27.1 |
| 7,513,473 B2 | 4/2009 | Lu et al. | |
| 7,690,614 B1 * | 4/2010 | Mudd et al. | 248/346.06 |
| 8,061,670 B1 * | 11/2011 | White | 248/311.2 |
| 8,807,621 B2 * | 8/2014 | Stephan | 296/37.12 |
| 2011/0147425 A1 * | 6/2011 | Di Miceli | 224/547 |
| 2011/0304963 A1 | 12/2011 | Luksik | |
| 2012/0199621 A1 * | 8/2012 | Yoon | 224/483 |
| 2012/0255982 A1 * | 10/2012 | Craig | 224/483 |
| 2013/0220010 A1 * | 8/2013 | Loomis et al. | 73/178 R |
| 2013/0299660 A1 * | 11/2013 | Emslie | 248/309.1 |

OTHER PUBLICATIONS

F150 Forum GPS Mount, Post Dated Oct. 19, 2010 by user 08f150xlt.*

* cited by examiner

*Primary Examiner* — Justin Larson
(74) *Attorney, Agent, or Firm* — Law Office of Jesse D. Lambert, LLC

(57) ABSTRACT

A GPS mount has a bracket with a base piece which has holes spaced so as to match the factory-installed screw holes in a vehicle dash tray. The factory screws are removed and inserted through the base piece hole, then replaced, securely holding the base piece in place. A mount plate is attached to the base piece and elevated above the dash tray. The mount plate has a smooth surface for secure placement of the suction cup of a GPS, cell phone, or other electronic device holder. The GPS mount is especially suited for pickup trucks manufactured by Dodge and/or Ram, for at least the model years 2009-2014.

15 Claims, 4 Drawing Sheets

FIG. 1
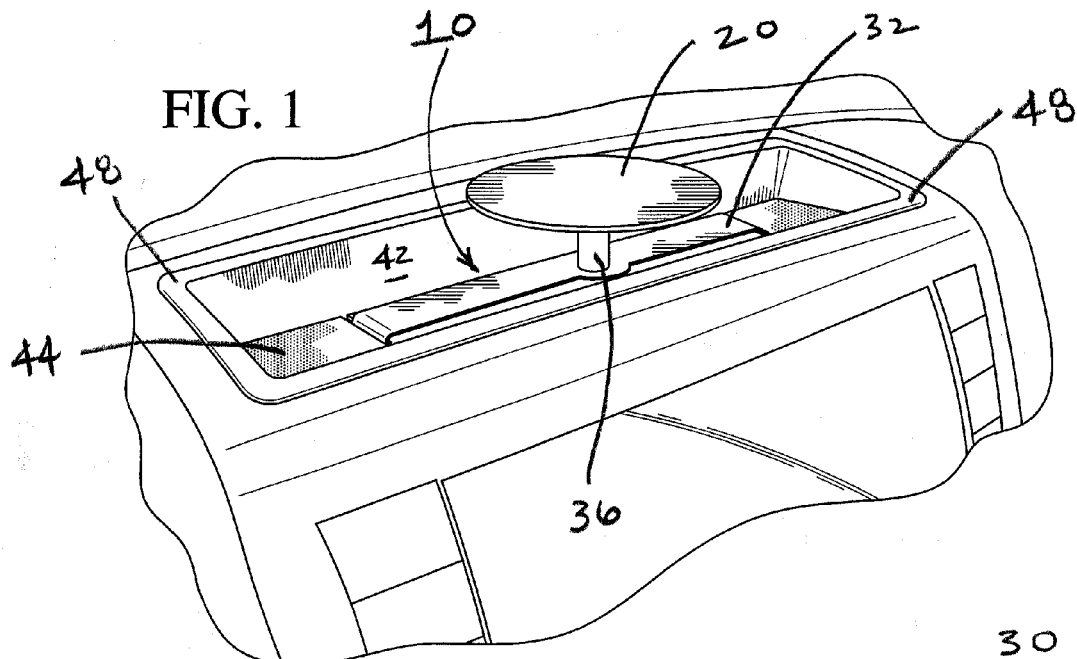
FIG. 2
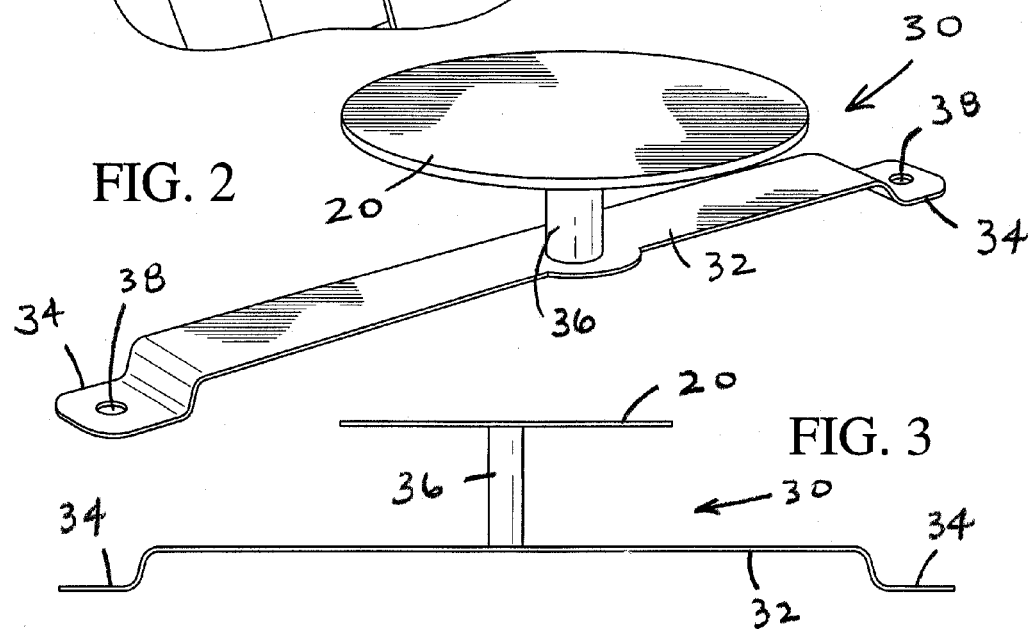
FIG. 3
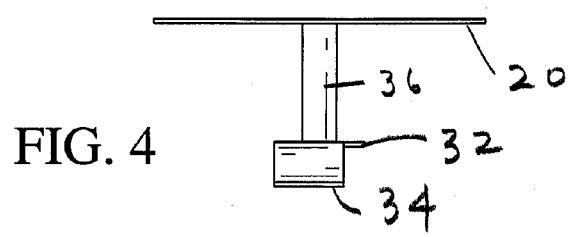
FIG. 4

GLOBAL POSITIONING SYSTEM (GPS) MOUNT

CROSS REFERENCE TO RELATED APPLICATIONS

This regular United States patent application claims priority to U.S. provisional patent application Ser. No. 61/692,506, filed Aug. 23, 2012, for all purposes.

BACKGROUND

Field of the Invention

This invention relates to apparatus for mounting various electronic devices, such as Global Positioning Systems ("GPS") units, cell phones, or other similar devices, in the interior of a vehicle, such as a pickup truck. While the scope of the present invention covers mounting of any type of electronic device, same will be collectively referred to as "GPS" units.

The increasing use of electronic devices, including but not limited to GPS units, has given rise to increased need to mount such devices within the vehicle. Generally, GPS units are desired to be mounted so that the driver (or possibly the passenger) of the vehicle can see the unit display and to reach it by hand, to manipulate screen prompts, buttons, etc. Cell phones are likewise desired to be mounted for easy access and use.

A common manner of mounting GPS units has the GPS unit removably fixed within a GPS holder, and the holder in turn fixed to some interior surface in the vehicle. Usually, the GPS unit snaps in to the GPS holder. Some holders mount within an air conditioning vent, with screws, clamps, etc., which creates problems due to blocking air flow. Other holders fix to the dash of the vehicle, using weights or adhesive, which may cause damage to the dash. Still others utilize a suction cup by which the holder is attached to some interior surface, such as the interior of the windshield. These designs present other problems, including a failure of the suction cup to adhere to the windshield (and the GPS unit consequently falling, potentially damaging same), largely due to the fact that the suction cup is suspending the weight of the holder and GPS; and/or partially obstructing the driver's vision, giving rise to safety concerns.

The known prior art mounting systems all present various issues, giving rise to a desire for an improved GPS mount that addresses these issues.

SUMMARY OF THE INVENTION

The GPS mount embodying the principles of the present invention provides a secure, unobtrusive surface upon which to fix a GPS holder, by suction cup or similar means. The GPS mount comprises a smooth disc or mount plate attached to a bracket, the bracket in turn attached to the dash of a vehicle, more particularly within the dash tray of a vehicle, by screws inserted into existing, factory installed screw holes in the vehicle dash. Particular shapes, dimensions, and configurations of the GPS mount can be altered to fit particular vehicles. Without limiting the scope of the invention to any particular vehicle, the GPS mount has particular applicability to pickup trucks manufactured by one or more divisions of Chrysler and/or Chrysler Group, LLC, commonly known in the marketplace as Dodge and/or Ram trucks, during the model years of 2009-2014. Other vehicles, and other model years, may also be suitable for use of the invention.

BRIEF DESCRIPTION OF THE DRAWINGS

FIG. 1 is a perspective view of one embodiment of a GPS mount embodying the principles of the present invention, in place in the dash tray of a vehicle.

FIG. 2 is a perspective view of one embodiment of a GPS mount embodying the principles of the present invention.

FIG. 3 is a front view of one embodiment of a GPS mount embodying the principles of the present invention.

FIG. 4 is a side view of one embodiment of a GPS mount embodying the principles of the present invention, looking down the longitudinal axis of the bracket.

DESCRIPTION OF THE PRESENTLY PREFERRED EMBODIMENT(S)

Figure 5:
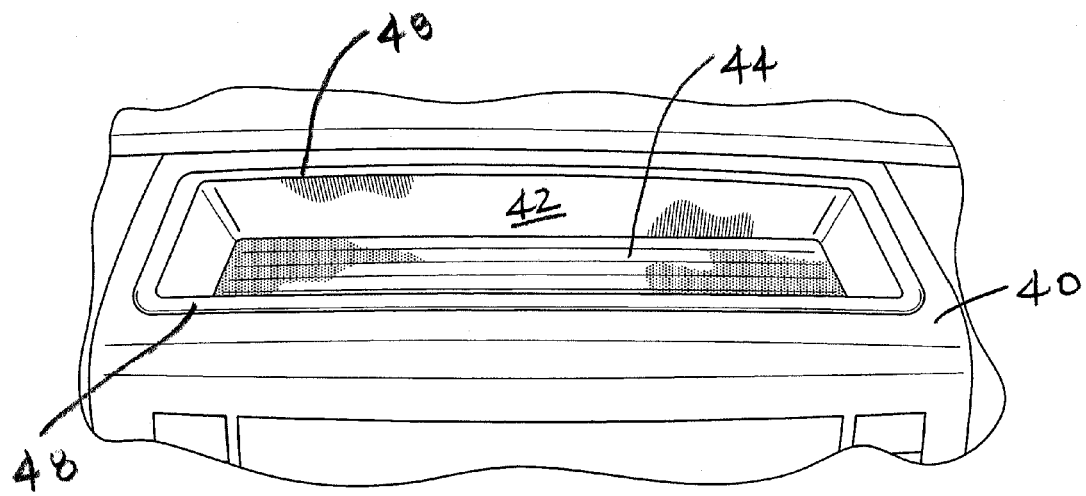
FIG. 5 is a view of the vehicle dash mounting area, more particularly the dash tray area.

While various GPS mounts can embody the principles of the present invention, with reference to the drawings some of the presently preferred embodiments can be described.

GPS mount 10 comprises a bracket 30 which comprises a mount plate 20 and a base piece 32. Base piece 32, in a preferred embodiment, further comprises foot sections 34 at either end, and a post 36 disposed between foot sections 34. Base 32 further comprises holes 38 for attachment to the dash of a vehicle, as further described.

Mount plate 20 is sized to accommodate the suction cup of a GPS holder. Preferably, mount plate 20 is generally circular, but may be any shape, e.g. a square, rectangle, octagonal, or other polygon, or some irregular shape. Preferably, the surface of mount plate 20 is very smooth to enable a suction cup to form a good seal thereon.

As can be seen from the drawings, mount plate 20 is preferably elevated from base piece 32. While different configurations are possible, one embodiment uses a post 36 attached to base piece 32, with mount plate 20 affixed to the upper end of post 36.

Figure 6:
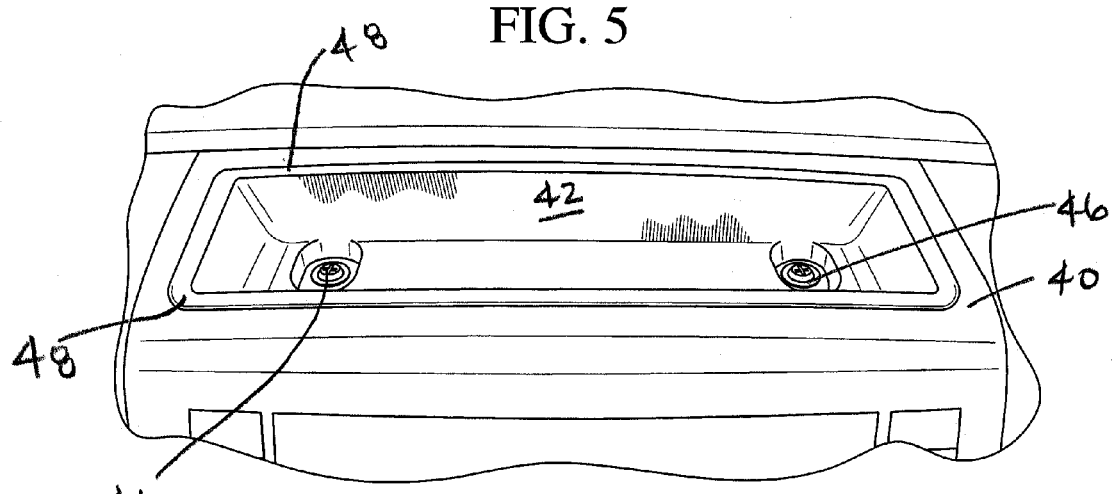
FIG. 6 is a view of the vehicle dash mounting area, with the filler pad removed and the factory installed, pre-existing screws exposed.
Figure 7:
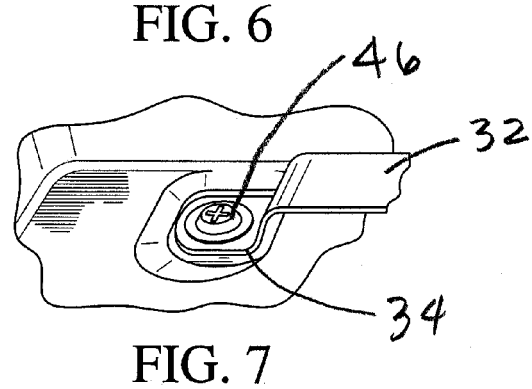
FIG. 7 is a view of a foot of the GPS mount (the bracket thereof) screwed in place.
Figure 8:
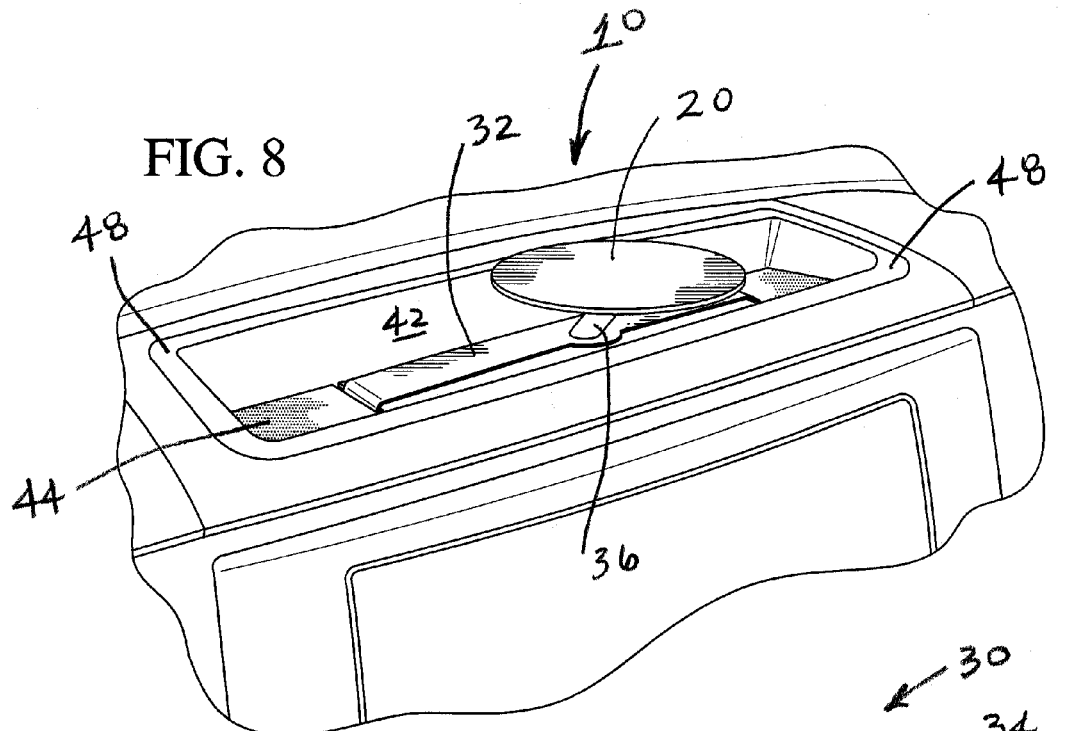
FIG. 8 is a perspective view of another embodiment of a GPS mount embodying the principles of the present invention, in place in the dash tray of a vehicle.
Figure 9:
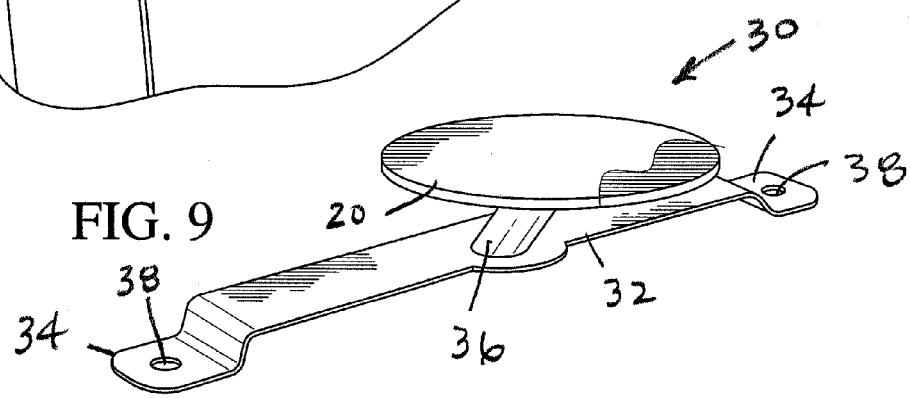
FIG. 9 is a perspective view of the GPS mount embodiment of FIG. 8.
Figure 10:
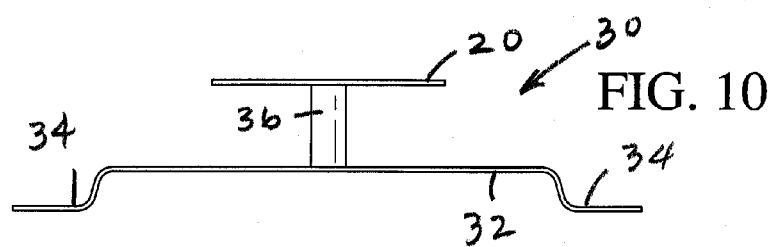
FIG. 10 is a front view of the GPS mount embodiment of FIG. 8.
Figure 11:
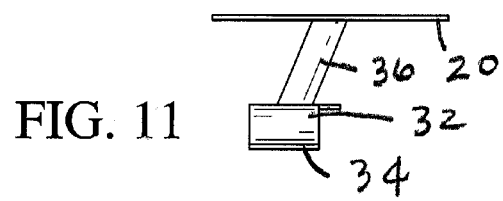
FIG. 11 is a side view of the GPS mount embodiment of FIG. 8.

Generally, GPS mount 10 is particularly, although not exclusively, adapted to use in vehicles having a recessed dash tray as factory provided equipment, as manufactured. FIG. 5 is a perspective view of a typical dash 40, showing a dash tray 42 with a filler pad 44 in place in the bottom of dash tray 42. FIG. 6 is a similar view but with filler pad 44 removed, showing factory-installed screws 46 which serve to hold dash tray 42 and/or other parts of dash 40 in place. Screws 46 are generally set into a recessed area in dash tray 42, as seen. It is the use of factory-installed screws 46, to hold bracket 30 in place, which is a key aspect of the present invention. Such factory installed screws provide a secure manner to afix bracket 30, with no alternation of the vehicle, save for cuts in filler pad 44 to permit filler pad 44 to fit around bracket 30.

Installation of the GPS Mount

FIG. 1 is a view of GPS mount 10 fixed in place in dash tray 42. To install GPS mount 10, filler pad 44 is first removed, exposing factory-installed screws 46 as seen in FIG. 6. Factory installed screws 46 are removed, and bracket 30 is placed within tray area 42 so that holes 38 in base piece 32, more particularly in foot sections 34, are aligned with the holes into which factory-installed screws 46 fit. Factory-installed screws 46 are inserted through holes 38, and tightened. Bracket 30 is then held securely in place.

If desired, filler pad 44 is then put back in place. Usually, this requires that slots be cut in filler pad 44 to permit filler pad 44 to fit around base piece 32. Of course, if desired, filler pad 44 can be left off.

As can be seen by the drawings, mount plate 20 is elevated above the surface of tray area 42, and typically above the lip 48 surrounding dash tray 42, to provide clearance for mount plate 20. Typically, the dimensions of mount plate 20 are too large to permit it to fit into dash tray 42 (namely, dash tray 42 is too narrow), therefore mount plate 20 is necessarily elevated high enough that it can overlap the lip surrounding dash tray 42.

It can be appreciated that the dimensions of bracket 30, more particularly base 32 and the spacing of holes 38, are very important to installation of bracket 30. Namely, the spacing of holes 38 must permit re-installation of factory installed screws 46. Preferably, holes 38 and the holes in which factory installed screws 46 mount "line up," although it is possible that slotted type holes 38 could be used to permit some dimensional adjustment. Other types of positional adjustment means are possible and contemplated within the scope of the invention.

While GPS mount 10 may have application to different vehicles, without limiting the scope of the invention to any particular vehicle, GPS mount 10 has particular applicability to pickup trucks manufactured by one or more divisions of Chrysler and/or Chrysler Group, LLC, commonly known in the marketplace as Dodge and/or Ram trucks, during the model years of 2009-2014. Such pickup trucks have a factory installed tray area 42, along with factory installed screws 46, as seen in FIGS. 5 and 6. Other vehicles, and other model years, may also be suitable for use of the invention.

Other Embodiments of the GPS Mount

Certain vehicles, namely certain 2013-2014 (and perhaps future) Ram pickup trucks have a configuration of tray area 42 which gives rise to a modified design of bracket 30, as can be seen in FIGS. 8-11. The primary aspect of this model vehicle is that the placement of factory-installed screws 46, with respect to the lip area 48 of dash tray 42, requires that mount plate 20 be positioned rearwardly (toward the rear of the vehicle) of a center (i.e. the longitudinal axis) of base piece 32, to provide the requisite clearance. One embodiment is shown in FIGS. 8-11, which shows post 36 inclined toward the rear of the vehicle (see especially the side view of FIG. 11), and rearward of the center or longitudinal axis of base piece 32, which in turn positions mount plate 20 rearwardly and provides the required clearance.

Figure 12:
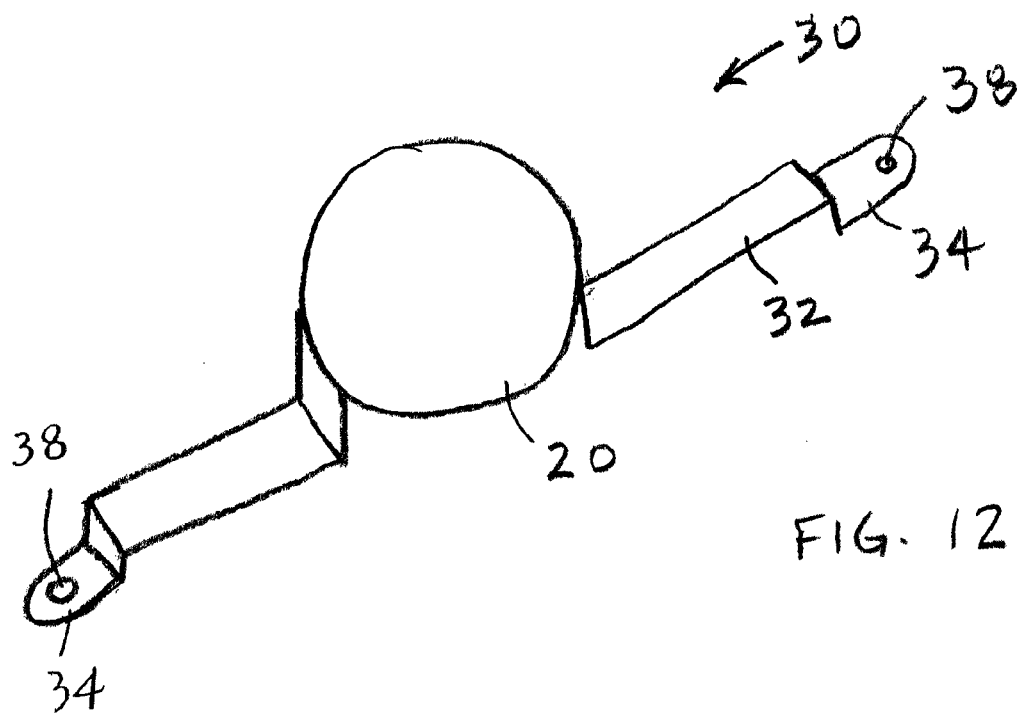
FIGS. 12 and 13 are perspective and front views, respectively, of another embodiment of the GP S mount.
Figure 13:
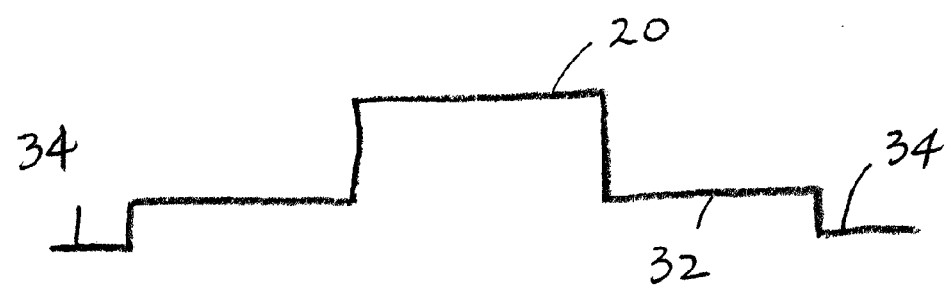

Yet another embodiment of GPS mount 10 is a unitary fabrication of bracket 30, as seen in FIGS. 12 and 13, in which base piece 32 and mount plate 20 are formed from a single piece of material, e.g. sheet steel. An appropriate profile is cut out, and bracket 30 bent to form the desired shape, as seen.

Manufacture of the GPS Mount, Dimensions

GPS mount 10 may be made of a number of suitable materials, including metals, high strength plastics, etc., or a combination thereof. One presently preferred embodiment is fabricated from metal, with base piece 32, post 36, and mount plate 20 joined by welding or similar means. Other materials and methods of fabrication are possible. As noted above, other embodiments may be made by pressing, bending, etc. from a single piece of sheet metal.

Dimensions may be varied to suit particular applications. However, representative dimensions may be as follows. Mount plate 20 may be approximately 2½" to 3" in diameter. Post 36 may be approximately ¾" to ⅞" in length. Base piece 32 may be approximately ⅝" wide. The spacing between holes 38 must substantially match the spacing between factory installed screws 46; for earlier model (c. 2009-2013) Dodge/Ram trucks, this spacing is approximately 5.67" (140 mm); for later model Dodge/Ram trucks, this spacing is approximately 4.88" (124 mm). In the embodiment shown in FIGS. 8-11, the angle of inclination of post 36 may be approximately 22 degrees.

CONCLUSION

While the preceding description contains many specificities, it is to be understood that same are presented only to describe some of the presently preferred embodiments of the invention, and not by way of limitation. Changes can be made to various aspects of the invention, without departing from the scope thereof. For example, different materials can be used to fabricate the bracket; different shapes and dimensions can be used to suit particular vehicles and/or GPS holders, etc.

Therefore, the scope of the invention is to be determined not by the illustrative examples set forth above, but by the appended claims and their legal equivalents.

I claim:

1. An apparatus for providing a suitable mounting surface, within the interior of a vehicle, for the suction cup of a GPS holder comprising a suction cup, comprising:
    an elongated base piece having spaced-apart holes therein, said base piece sized and shaped to fit within a dash tray in a vehicle, said spacing between said holes substantially matching the spacing of factory-installed screws in said dash tray; and
    a mount plate attached to said base piece and elevated above said base piece, said mount plate sized to permit placement of said suction cup thereon.

2. The apparatus of claim 1, further comprising a post attached to said base piece and extended upwardly therefrom, said mount plate attached to an upper end of said base piece.

3. The apparatus of claim 2, wherein said post is angled toward the rear of said vehicle and a center of said mount plate is positioned rearwardly of a center of said base piece.

4. The apparatus of claim 1, wherein said base piece and said mount plate are formed from a single piece of sheet material, said sheet material cut and bent to form a desired configuration of said base piece and said mount plate.

5. An apparatus for providing a suitable mounting surface, within the interior of a vehicle comprising a dash tray having spaced apart, factory installed screw holes therein, for the suction cup of a GPS holder comprising a suction cup, comprising:

an elongated base piece having first and second ends, and a foot section at each of said ends, each foot section having a hole therein, a distance between said holes matching a distance between said spaced apart, factory installed screw holes in said dash tray of said vehicle, whereby a screw can be inserted through said holes in said feet and into said factory installed screw holes;

said base piece further comprising a suction cup mount plate comprising an elevated surface dimensioned to permit said suction cup to affix thereto and positioned to clear a lip surface adjacent said dash tray.

6. The apparatus of claim 5, wherein said apparatus comprises a post attached to said base piece and extending upwardly, said mount plate attached to an upper end of said post and forming said elevated surface.

7. The apparatus of claim 6, wherein said vehicle comprises a Dodge brand pickup truck.

8. The apparatus of claim 7, wherein said vehicle comprises a 2009-2013 year model.

9. The apparatus of claim 6, wherein said vehicle comprises a Ram brand pickup truck.

10. The apparatus of claim 9, wherein said vehicle comprises a 2014 or later year model.

11. The apparatus of claim 6, wherein said post is angled so as to position said mount plate in a position rearward of a center of said base piece.

12. The apparatus of claim 5, wherein said base piece and said mount plate are formed from a single piece of sheet material, said sheet material cut and bent to form a desired configuration of said base piece and said mount plate.

13. A vehicle GPS mounting system, comprising:

a vehicle comprising a dash tray, and a pair of spaced apart, factory-installed screw holes and screws disposed within said dash tray;

a bracket fixed in said dash tray, said bracket comprising an elongated base piece with a pair of spaced apart holes therein, a spacing of said spaced apart holes matching the spacing of said factory installed screws, said bracket fixed in said dash tray by screws inserted through said base piece holes and screwed into said factory installed holes; and an elevated mount plate fixed to said base piece, said mount plate sized to accommodate a suction cup of a GPS holder.

14. The GPS mounting system of claim 13, wherein said mount plate is positioned toward the rear of said vehicle, sufficiently far for said mount plate to fit above said dash tray.

15. The GPS mounting system of claim 13, wherein said base piece and said mount plate are formed from a single piece of sheet material, said sheet material cut and bent to form a desired configuration of said base piece and said mount plate.

* * * * *